(No Model.)  M. MARTIN.  2 Sheets—Sheet 1.
ROLLER MILL.
No. 246,623.  Patented Sept. 6, 1881.
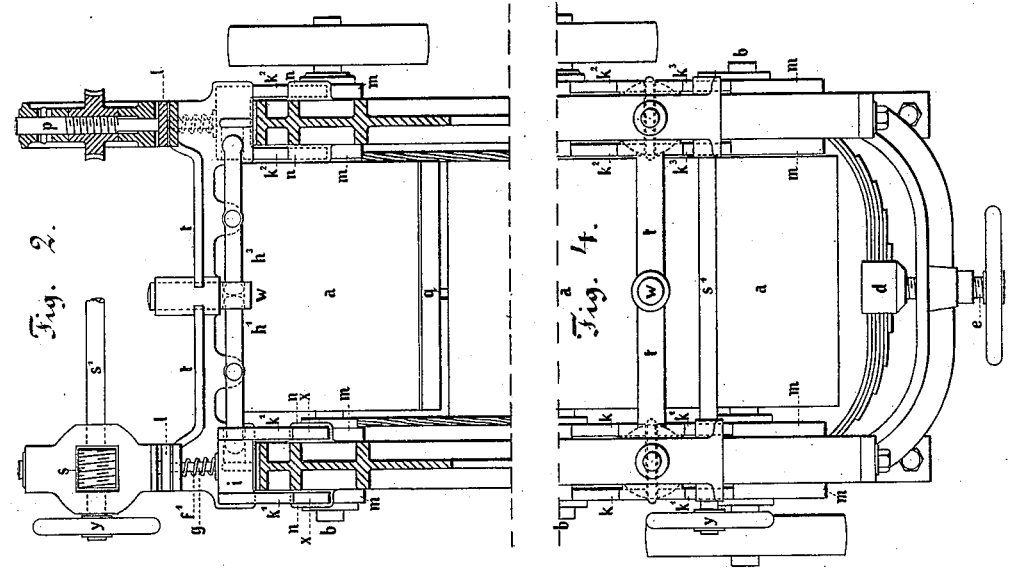
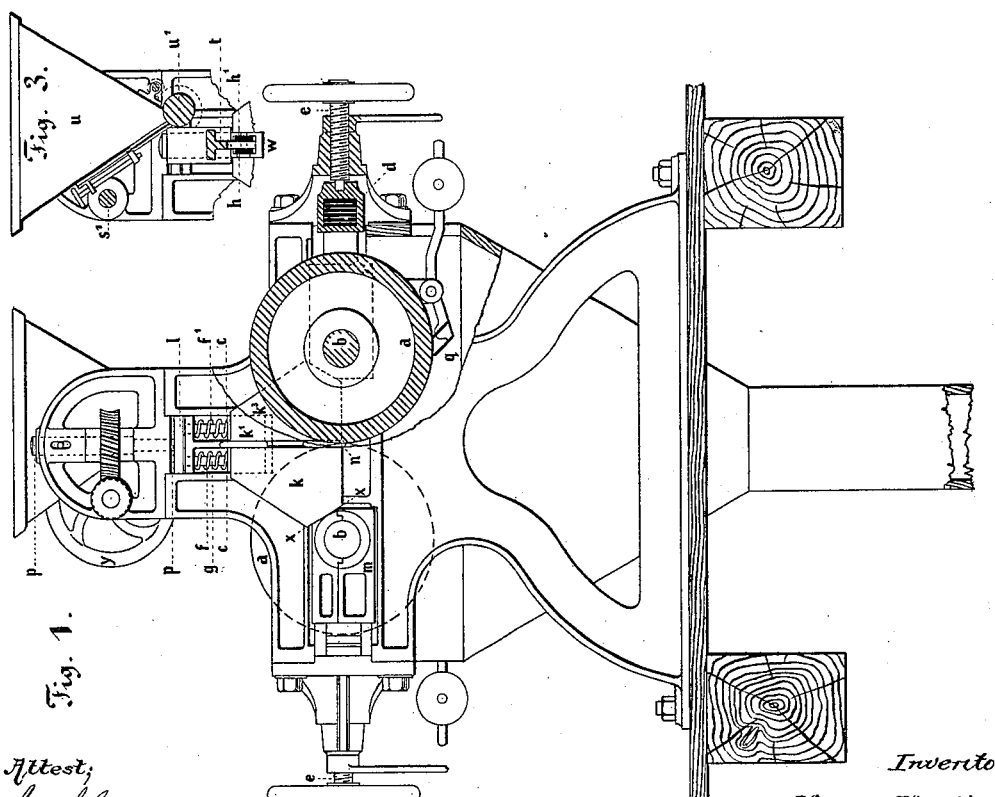
Attest:
Geo. H. Graham
T. H. Palmer
Inventor,
Moritz Martin,
by Munson & Philipp
Attys.

(No Model.) 2 Sheets—Sheet 2.
M. MARTIN.
ROLLER MILL.
No. 246,623. Patented Sept. 6, 1881.
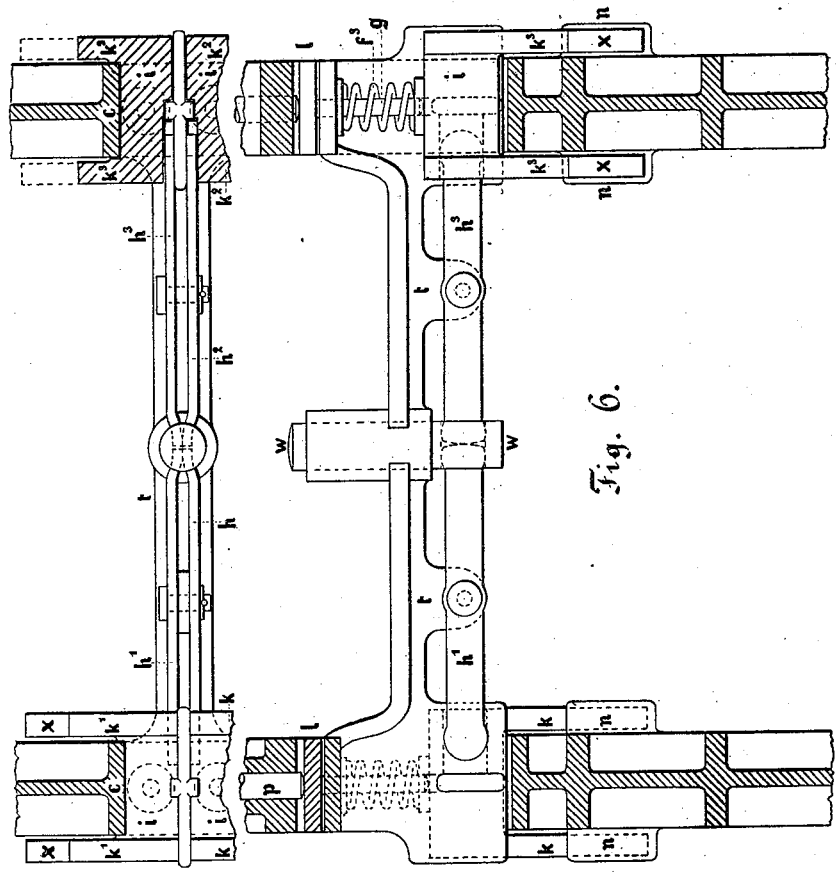
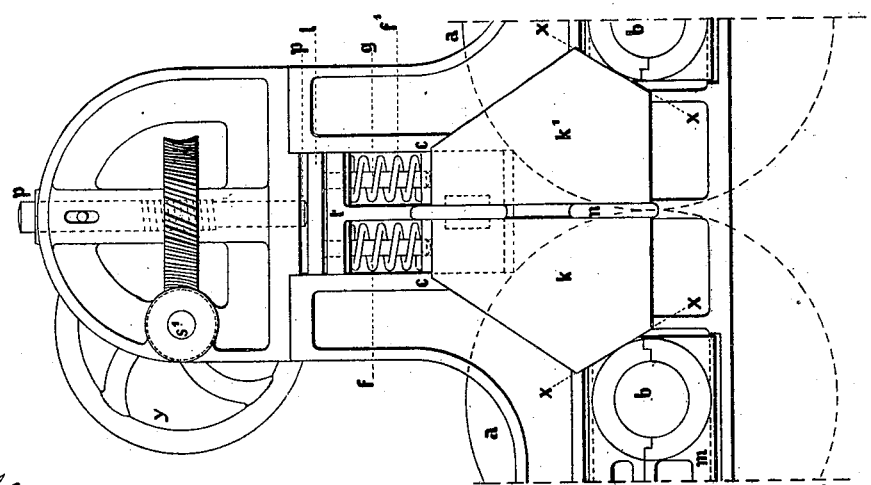

UNITED STATES PATENT OFFICE.

MORITZ MARTIN, OF BITTERFELD, PRUSSIA, GERMANY.

ROLLER-MILL.

SPECIFICATION forming part of Letters Patent No. 246,623, dated September 6, 1881.

Application filed July 26, 1880. (No model.) Patented in Germany August 26, 1879; addition December 18, 1879.

*To all whom it may concern:*

Be it known that I, MORITZ MARTIN, of Bitterfeld, Prussia, have invented new and useful Improvements in Roller-Mills, of which the following is a specification.

My invention relates to a roller-mill in which the two rollers are pressed against each other by springs, and which is provided with special arrangements serving for the purpose of regulating the space between the rollers and of equalizing the pressure of the springs on the four bearings of the rollers.

The improved machine is represented on the annexed two sheets of drawings.

Figure 1 shows an end view, partly in section, the hopper being removed. Fig. 2 is a longitudinal vertical section; Fig. 3, a section of the hopper with adjacent parts; Fig. 4, a part of the plan, while the Figs. 5 to 7 represent the new parts on a larger scale.

The rollers $a\ a$, made of chilled cast-iron, porcelain, or other suitable material, revolve by their journals $b\ b$ in bearings $m\ m$, which are either capable of sliding in horizontal guides formed by the frame of the machine or which are made movable in any other suitable manner.

$d\ d$ are springs composed, in the style of carriage-springs, of a series of steel blades, and pressing on the said bearings. The tension of these springs, and consequently the pressure of the rollers against each other, can be regulated by the screws $e\ e$.

The arrangement serving to adjust the interval between the rollers, and which constitutes the first part of this invention, is as follows: Against an incline on the bearings $m\ m$ the pieces $k, k', k^2$, and $k^3$ act by their inclined faces $x\ x$. (See Figs. 1 and 5.) Each of these pieces consist of two plates of equal shape united by a bridge or guide-block, $i$, the latter serving to guide the said piece $k\ k'$, &c., between one of the cheeks $c\ c$ of the frame and the center rib of the cross-beam $t$, as may be seen to best advantage from the Figs. 5 and 7, the latter representing the said beam $t$, with parts relating to the same in a view from below. On each of the bridges $i$ presses, from above, a pin, $g$, the two pins on either side of the machine being fixed in a plate, $l$, operated upon by a screw, $p$, whose nut forms a worm-wheel gearing with a worm, $s$. The two worms $s$ (one on either side) being keyed on one shaft, $s'$, all the pieces $k$, &c., will be pressed downward uniformly when the hand-wheel $y$ is turned in the proper manner. In consequence of such lowering of the said pieces these will act by their inclined faces $x\ x$ as wedges against the bearings $m$ and press the rollers apart from each other equally on both sides. During their operation the pieces $k$ bear with their backs against the projections $n$ on the frame of the machine. The screws $p\ p$ being drawn back, the springs $d\ d$ cause the rollers to approach each other again, while the bearings $m\ m$ press the wedge-pieces $k\ k'\ k^2\ k^3$ upward. The interval between the rollers can thus be regulated with great nicety, and in case the rollers are adjusted very close to each other the described arrangement prevents one roller striking against the other if any foreign body—such as a stone—should happen to fall between the rollers, and to force them apart during its passage.

The second part of my invention consists in arrangements for maintaining equal the pressure of the springs $d$ on the four bearings of the rollers, even when the tension of either spring should become less at one end from some accidental cause. For this purpose the following combination has been adopted: Between the wedges $k\ k'\ k^2\ k^3$ and the ends of the beam $t$ the springs $f\ f'\ f^2\ f^3$ (which may be of spiral or other suitable shape) are inserted. Each of these springs tends to press downward and against the force of the springs $d$ by means of the wedges $k, k', k^2$, or $k^3$, on which it acts. Any motion actually imparted to one of the wedges—for instance, $k$—is, however, transferred to the parts $k', k^2$, and $k^3$ in the following manner: $h$, $h', h^2$, and $h^3$ are four levers of equal size, pivoted at their centers to the cross-beam $t$, and penetrating with one end into a recess in the corresponding part $k$, whereas their other ends enter together into a hole at the lower end of the bar $w$, which is guided in a hollow boss in the center of the beam $t$. It follows from this arrangement that when one wedge-piece is shifted the other corresponding parts will be displaced in the same manner. Supposing, now, the pressure of one of the springs $d$ to become less at one end from any cause whatever—such as, for instance, a want of uniformity of the metal out of which it is made—the end of the roller on which the weaker part of the spring acts cannot compress to the same extent the substances to be crushed, and will therefore recede farther from the co-operating roller than the end acted upon with the full force by the other spring part; but as soon as this occurs the wedge-piece corresponding with the roller end which recedes farther—for instance, the piece $k$—will be pushed downward by its spring $f$, whereby the end of the lever $h$ engaging with $k$ is also made to descend, while its other end, catching, together with the corresponding ends of the levers $h'$, $h^2$, and $h^3$, into the sliding bar $w$, causes this bar to rise and the levers $h' h^2 h^3$ to be shifted in the same manner as $h$. The part of the force of the spring $f$ which had become free by the decrease of the resistance acting against it, is thus caused to assist the other springs, $f' f^2 f^3$, in overcoming the stronger counter-pressure of the springs $d$, to which they are exposed, until a balancing of the forces has taken place at the four points and the pressures against the bearings of the rollers have become equal. The wear of the surface of the rollers is hereby rendered uniform upon their whole length.

As a point of secondary importance, not constituting an essential part of this invention, may be mentioned the scrapers $q$. These are pivoted by their levers to arms fixed to the bearings $m$, so that they will be shifted together with the rollers, and that they consequently always act upon them in the same manner. Each scraper consists of two blades, of which one is pressed against the roller by the weight at the end of the lever, while the other blade is caused to operate by means of a spring attached to the first blade. The material to be ground is fed in between the rollers from a hopper, $u$, by means of a feed-roller, $u'$, which is put in rotation in any suitable manner. The rollers are, by preference, both provided with a pulley, so that they may each be driven by a separate strap.

With regard to modifications of the described machine, it is to be observed that the wedge-pieces on either side of the same may be united in one, if preferred. Thus $k$ and $k'$ on the one hand and $k^2$ and $k^3$ on the other may form one piece, and each of these combined parts need be provided but with a single spring, $f$, and a single lever, $h$, while the pins $g\ g$ are replaced by an elongation of the screw $p$.

I claim as my invention—

1. The combination, with the grinding-rollers $a$, having movable bearings $m$, provided with springs $d$, of yielding wedge-pieces interposed between the opposed bearings of said rollers, and screws $p$, that are actuated by a single shaft and worm-wheel gearings to simultaneously operate said wedge-pieces, substantially as described.

2. The combination, with the rollers $a$, movable bearings $m$, springs $d$, and wedge-pieces, as $k\ k'\ k^2\ k^3$, of springs, as $f\ f'\ f^2\ f^3$, and levers, as $h\ h'\ h^2\ h^3$, operating substantially as described, and for the purpose set forth.

In testimony whereof I have signed my name to this specification in the presence of two subscribing witnesses.

MORITZ MARTIN.

Witnesses:
HENRY VAN ARSDALE,
J. E. MONTGOMERY.